Patented Dec. 16, 1952

2,622,056

UNITED STATES PATENT OFFICE 2,622,056

ADHESIVE COMPOSITIONS AND METHOD OF BONDING POLYETHYLENE USING SAME

Robert A. De Coudres, Millington, and Clayton S. Myers, Fanwood, N. J., assignors, by mesne assignments, to Union Carbide and Carbon Corporation, a corporation of New York No Drawing. Application November 1, 1947, Serial No. 783,618

9 Claims. (Cl. 154—139)

This invention relates to adhesive compositions and is more particularly concerned with adhesives which are suitable for cementing and securing polyethylene resin to itself and to metals, glass, wood, ceramics and other materials.

Polyethylene resin through its chemical inertness and its non-solubility in most chemicals, coupled with its exceptionally high dielectric properties, provides a material which is eminently suited for lining pipes, tanks, reaction vessels, heat exchangers and other industrial equipment as well as for covering electrical equipment to shield and insulate it. The type of polyethylene resin which exhibits these characteristics and to which this invention is directed is essentially a mixture of straight-chain polymers of ethylene having average molecular weights of from about 800 to 40,000 or higher. It is produced by subjecting ethylene gas to pressures in excess of 5000 pounds per square inch while being maintained at an elevated temperature and usually in the presence of a suitable catalyst.

The development of polyethylene resin as a lining material wherever protection or insulation is needed has been seriously curtailed because conventional lacquers or solvent-type adhesives which have served so well with other resins for lining purposes are ineffective for this insoluble resin. While the inutility of these adhesives for cementing polyethylene has been partially compensated for in restricted applications of bonding the resin to itself and to certain base materials by the simultaneous application of pressure and heat, this latter method is unsatisfactory for shapes of large size or having intricate surface characteristics and is ineffective for adhering the resin to metals. The use of pressure-sensitive adhesives of the customary rubber base composition has been unsatisfactory for most purposes because their bonding strength is low and the durability of the bond is insufficient to avoid separation of the resin from the base material by the customary mechanical abuse and thermal expansion of the lined equipment in use.

It is an object of this invention to set forth adhesive compositions which securely bind polyethylene resin to itself and to other surfaces such as metal, glass, wood and ceramics. It is a further object to disclose adhesives which may be used for bonding polyethylene resin to shapes of all sizes and having varying surface characteristics as well as to all types of metals. In addition it is an object to provide adhesives for cementing polyethylene resin to industrial equipment which will have bonding strength that is capable of resisting separation thereof by stresses resulting from mechanical use or thermal expansion of the equipment. Finally, it is an object to set forth adhesive compositions which when employed to cement polyethylene resin to electrical equipment provide a shielding and insulation of high resistance. Other objects will be apparent from the following description.

This invention resides in the discovery of adhesive compositions having highly tenacious characteristics for all types of surfaces, and particularly polyethylene resin. These adhesives are products of compounding halogenated aromatic hydrocarbons with polyethylene resin at elevated temperatures. They are tough, elastic, water-resistant solids which become fluid or semi-fluid on heating to a temperature within the range of 120° to 200° C. They may be applied to surfaces when hot by pouring, brushing, dipping or troweling, or when cold by surface distribution of granulated particles with subsequent heating of the base material to a temperature within or slightly above the previously prescribed fluid temperature range. On cooling, the adhesives solidify and firmly attach themselves to the surface with a secure bond. Their tenacious adherence to polyethylene resin as well as to most surfaces, coupled with their elastic nature, renders these adhesives suitable for lining and electrically insulating equipment with polyethylene resin.

The halogenated aromatic hydrocarbons (hereinafter referred to as hydrocarbons) which have been found suitable for preparing these adhesives are those having a halogen content within the range of 30% to 75% by weight. They may be mixtures or pure compounds as long as their average halogen content falls within this range. Examples of such halogenated aromatic hydrocarbons are, halogenated diphenyls or biphenyls, halogenated naphthalenes, halogenated benzenes and modified compounds thereof. Within the broad range of halogen content referred to above, there exist preferred ranges as to certain types of halogenated hydrocarbons. For example, when halogenated diphenyls or biphenyls are employed, the preferred halogen range is from about 60 to about 65%; when halogenated naphthalene is employed, the preferred range is from about 30 to about 65%; and when halogenated benzenes are employed, the preferred range is from about 60 to about 70%. Any type of polyethylene resin prepared by the process previously described, whether it be a mixture of polymers of varying molecular weights or polymers of substantially the same molecular weight, may be selected for compounding. However, the preferred polyethylene resins are those having an average molecular weight within the range of 15,000 to 20,000 as determined by their possessing an average flow height of 55 mils at 130° C., when tested in a Williams Parallel Plate Plastometer by the method described in Journal of Industrial and Engineering Chemistry, vol. 16, No. 4, 1924, p. 362.

For compounding the halogenated aromatic hydrocarbon and resin, it is recommended that equipment be used which is capable of working or stirring these materials while providing heat for them. This may be performed simply in an open container having heating facilities and manual stirring, or mechanically in either an open two-roll mill with heated rolls or an open heat-jacketed intensive mixer. The length of compounding time varies according to the selection of raw materials. Usually about two hours are required in most cases with more or less time for others depending on the desired consistency of the adhesive, as the viscosity of the adhesive increases by increasing the compounding time. The best compounding temperature is at or above the softening temperature of polyethylene resin (about 108° to 112° C.) and preferably below 200° C. Compounding by mill-mixing should be at a much lower temperature than by kettle-mixing. For mill-mixing, a temperature between 100° and 105° C. has been found satisfactory, whereas for open kettle-mixing, a temperature between about 150° and 180° C. is suitable.

While the adhesive may be compounded from halogenated aromatic hydrocarbon and resin in most any proportion of each, the best range of proportion appears to be from one part halogenated aromatic hydrocarbon-three parts resin to three parts halogenated aromatic hydrocarbon-one part resin. This range will effect a halogen content of the adhesive, when employing the previously specified halogenated aromatic hydrocarbons, in the range of 7½% to 60% by weight. While the halogen content in the adhesive can vary over the above range, the most useful results are obtained when the adhesive halogen content is from about 15 to about 50% in the instance of diphenyls or biphenyls, from about 7½ to about 50% in the instance of halogenated naphthalenes, and from about 15 to about 55% in the instance of halogenated benzenes.

The invention is further illustrated by the following examples. (All proportions given are on a weight basis.)

EXAMPLE 1

One part polyethylene resin and three parts chlorinated biphenyl (60% average chlorine content) were compounded for two hours at 180° C. in a National Erie mixer. After permitting the mixture to cool, the solidified adhesive formed was removed and ground into small chips. It was subsequently heated in a container to 175° C. and then poured on one surface of various metal plates which had been previously heated to 190° C. Excess adhesive was wiped off the plates until only a thin film remained, and to each a 0.015" thick calendered polyethylene sheet was applied and pressed. The lined plates were cooled and tested for bond strength of the adhesive. It was found that the adhesive bond was sufficiently strong to resist severe mechanical abuse below 90° C., in fact, in most cases the bond was as strong or stronger than the cemented film. Included in the metal plates which were tested, were cold rolled steel, lead, stainless steel, aluminum, brass, copper, galvanized steel, chromium and cast iron.

EXAMPLE 2

A mixture of one part polyethylene resin and three parts chlorinated biphenyl (60% average chlorine content) was compounded on an 8" x 16" two-roll mill whose rolls were internally heated to a temperature between 100° and 105° C. On cooling the adhesive, it was found that at 90° to 95° C. the resin could be easily released from the rolls, but if cooled to a temperature below this it adhered very tightly to the metal rolls. Onto a chromium plated steel plate heated to 190° C., molten adhesive was poured and wiped leaving a thin film. A 0.055" thick calendered sheet of polyethylene resin was applied to the adhesive coated surface and pressed thereto in a hydraulic press at a pressure of 500 pounds per square inch while the platens of the press were maintained at a temperature of 120° C. by circulating steam in their chambers. The resin-coated steel plate was subsequently cooled by circulating water in the press platens and thereafter the pressure was released. The bonding strength of the adhesive between the plate and the resin was found to be very strong.

EXAMPLE 3

Adhesives of the following compositions were separately compounded in a heated glass container while being manually stirred at 150° C.

*Adhesive A*

One part polyethylene resin.
Three parts chlorinated naphthalene (56% average chlorine content).

*Adhesive B*

One part polyethylene resin.
Three parts chlorinated naphthalene (62% average chlorine content).

*Adhesive C*

One part polyethylene resin.
Three parts 1, 2, 4, 5 tetrachlorbenzene (65% chlorine content).

*Adhesive D*

One part polyethylene resin.
Three parts para dibromobenzene (68% bromine content).

All of these adhesives were found to adhere very tenaciously to glass after being heated to about 150° C. and permitted to cool on the glass surface. Each of these adhesives, after being heated to 150° C., was spread with a spatula on clean steel plates which had been previously heated to 150° C. Onto each coated plate, a 0.020" thick sheet of polyethylene resin was placed and lightly rolled. After cooling, each plate was tested for the bond strength of the various adhesives. Adhesive A possessed good bond strength, adhesives B and C bond strength equal to that of polyethylene resin and adhesive D superior to that of the resin.

EXAMPLE 4

Three parts polyethylene resin were compounded with one part of chlorinated naphthalene (30% average chlorine content) at a temperature of 150° C. in an intensive mixer. Polyethylene resin of 0.020" thickness was cemented with this adhesive to a sheet of steel and to a sheet of aluminum. The strength of adherence of the resin to the plates was found to be equal to or better than the strength of the resin itself.

EXAMPLE 5

An adhesive was compounded from equal parts of polyethylene resin (average molecular weight of about 7000) and chlorinated biphenyl (65% average chlorine content) in an intensive mixer at a temperature of 150° C. Samples of the adhesive were used for cementing 0.020" thick polyethylene resin sheeting to itself, to a steel plate and to an aluminum plate. The bond formed in each instance was found to be as strong as the resin itself.

These examples illustrate only limited applications of the invention. It is to be understood that many modifications and variations of the compounded adhesives may be made within the prescribed range without deviating from the broader aspects of the invention. The manner of compounding may be varied without changing the scope of the invention as it is not intended to be a part of the invention. Finally the means of applying the adhesive is of no important concern of this invention. As long as the adhesives are applied hot or are heated after application and the polyethylene resin is applied thereto while the adhesive is fluid or semi-fluid and is maintained in close contact until the adhesive is cooled, a satisfactory bond will be achieved.

It is to be understood that this invention is not limited to the specific embodiments disclosed herein except as defined by the following claims.

We claim:

1. An adhesive composition for securing polyethylene resin to surfaces consisting of a halogenated diphenyl having an average halogen content of from about 60 percent to about 65 percent by weight, and a polyethylene having an average molecular weight above 800 compounded together at an elevated temperature above the polyethylene's softening temperature and below 200° C.

2. An adhesive composition for securing polyethylene resin to surfaces consisting of a halogenated diphenyl having an average halogen content of from about 60 percent to about 65 percent by weight, compounded at a temperature above 110° C. with polyethylene resin in proportions to effect a halogen content of said adhesive in the range of about 15 percent to about 50 percent by weight.

3. An adhesive composition for securing polyethylene resin to surfaces consisting of a halogenated naphthalene having an average halogen content of from about 30 percent to about 65 percent by weight, and a polyethylene resin having an average molecular weight above 800 compounded together at a temperature above 105° C.

4. An adhesive composition for securing polyethylene resin to surfaces consisting of a halogenated naphthalene having an average halogen content of from about 30 percent to about 65 percent by weight, compounded at a temperature above 110° C. with polyethylene resin in proportions to effect a halogen content of said adhesive in the range of about 7½ percent to about 50 percent.

5. An adhesive composition for securing polyethylene resin to surfaces consisting of a halogenated benzene having an average halogen content of from about 60 percent to about 70 percent by weight, compounded at an elevated temperature above 105° C. with polyethylene resin.

6. An adhesive composition for securing polyethylene resin to surfaces consisting of a halogenated benzene having an average halogen content of from about 60 percent to about 70 percent by weight, compounded at a temperature above 110° C. with polyethylene resin in proportions to effect a halogen content of said adhesive in the range of about 15 percent to about 55 percent by weight.

7. Polyethylene adhesive composition consisting of polyethylene resin compounded at a temperature between 100° C. and 200° C. with a halogenated aromatic hydrocarbon selected from the group consisting of halogenated benzenes having a halogen content from about 60 to 70 percent by weight, halogenated diphenyls having a halogen content of about 60 to 65 percent by weight and halogenated naphthalenes having a halogen content of about 30 to 65 percent by weight.

8. Polyethylene adhesive composition consisting of solid polyethylene compounded at a temperature between 100° C. and 200° C. with a halogenated aromatic hydrocarbon selected from the group consisting of halogenated benzenes having a halogen content from about 60 to 70 percent by weight, halogenated diphenyls having a halogen content of about 60 to 65 percent by weight, and halogenated naphthalenes having a halogen content of about 30 to 65 percent by weight and in proportion to effect a halogen content of said adhesive in the range of from about 7½ percent to about 60 percent by weight.

9. Process of bonding polyethylene to a surface, which comprises applying a composition as defined in claim 7 to the surface, heating the surface and the composition to about 120° to 200° C. to render the composition at least semi-fluid, pressure-applying polyethylene to the heated composition, and then cooling the bonded structure.

ROBERT A. DE COUDRES.
CLAYTON S. MYERS.

REFERENCES CITED

The following references are of record in the file of this patent:

UNITED STATES PATENTS

| Number | Name | Date |
|---|---|---|
| 2,340,452 | Child et al. | Feb. 1, 1944 |
| 2,384,848 | Peters | Sept. 18, 1945 |
| 2,429,861 | Woodbridge | Oct. 28, 1947 |
| 2,453,644 | Steinkraus | Nov. 9, 1948 |

OTHER REFERENCES

Hahn et al., pp. 526–530, Ind. and Eng. Chem., June 1945.

Maibauer et al., "Polyethylene," pp. 449 and 463, Preprint 90-36, The Electrochemical Society, 1946.